(12) United States Patent
Kim

(10) Patent No.: US 12,107,806 B2
(45) Date of Patent: Oct. 1, 2024

(54) METHOD AND SYSTEM FOR SHARING CONTENT ON INSTANT MESSAGING APPLICATION DURING CALLS

(71) Applicant: LINE Plus Corporation, Seongnam-si (KR)

(72) Inventor: Keumryong Kim, Seongnam-si (KR)

(73) Assignee: LINE Plus Corporation, Seongnam-si (KR)

( * ) Notice: Subject to any disclaimer, the term of this patent is extended or adjusted under 35 U.S.C. 154(b) by 46 days.

(21) Appl. No.: 17/880,798

(22) Filed: Aug. 4, 2022

(65) Prior Publication Data
US 2023/0047600 A1 Feb. 16, 2023

(30) Foreign Application Priority Data
Aug. 11, 2021 (KR) .......................... 10-2021-0106161

(51) Int. Cl.
*H04L 51/04* (2022.01)
*G06F 3/14* (2006.01)
*H04L 51/10* (2022.01)

(52) U.S. Cl.
CPC ............ *H04L 51/04* (2013.01); *G06F 3/1454* (2013.01); *H04L 51/10* (2013.01)

(58) Field of Classification Search
CPC ............. H04L 51/04–046; H04L 51/10; H04L 12/1813–1831; H04L 12/18–1895; G06F 3/1454–1462; G06F 3/048
See application file for complete search history.

(56) References Cited

U.S. PATENT DOCUMENTS

| | | | |
|---|---|---|---|
| 8,856,241 B1* | 10/2014 | Derhak | G06Q 10/107 709/206 |
| 10,708,543 B1* | 7/2020 | Breitbard | H04L 65/1069 |
| 11,360,634 B1* | 6/2022 | Chang | G06F 3/0482 |
| 11,368,423 B1* | 6/2022 | Plater-Zyberk | G06Q 30/0631 |
| 2003/0105819 A1* | 6/2003 | Kim | G06F 16/954 709/205 |
| 2014/0068467 A1 | 3/2014 | Van et al. | |
| 2014/0108568 A1* | 4/2014 | Lee | H04L 65/4015 709/227 |
| 2014/0294167 A1 | 10/2014 | Kim et al. | |
| 2016/0072861 A1* | 3/2016 | Woolsey | H04W 4/14 455/414.1 |

(Continued)

FOREIGN PATENT DOCUMENTS

KR 10-2012-0111859 A 10/2012
KR 10-2014-0117073 A 10/2014
(Continued)

*Primary Examiner* — Liang Y Li
(74) *Attorney, Agent, or Firm* — Sughrue Mion, PLLC

(57) ABSTRACT

A method for sharing content performed by at least one processor of a first user terminal includes initiating, through a first external device, a call between a first user account associated with the first user terminal and a second user account associated with a second user terminal included in a chat room of an instant messaging application, transmitting a co-view request associated with a content to share to the first external device, where the content to share is one of a plurality of contents shared within the chat room, and displaying the content to share with a call screen on a display of the first user terminal.

16 Claims, 10 Drawing Sheets

(56) References Cited

U.S. PATENT DOCUMENTS

| | | | |
|---|---|---|---|
| 2016/0285808 A1 | 9/2016 | Franklin et al. | |
| 2018/0278553 A1* | 9/2018 | Yu | H04L 51/02 |
| 2019/0339822 A1* | 11/2019 | Devine | G06V 40/16 |
| 2020/0137005 A1* | 4/2020 | Kim | H04L 51/42 |
| 2020/0314046 A1 | 10/2020 | Jung | |
| 2021/0096703 A1* | 4/2021 | Anzures | H04L 51/10 |
| 2021/0314523 A1* | 10/2021 | Kamisetty | H04L 65/1069 |
| 2022/0200937 A1* | 6/2022 | Bar-on | H04L 51/04 |

FOREIGN PATENT DOCUMENTS

| | | |
|---|---|---|
| KR | 10-2014-0131300 A | 11/2014 |
| KR | 10-2017-0051445 A | 5/2017 |
| KR | 10-2017-0131573 A | 11/2017 |
| KR | 10-1932007 B1 | 3/2019 |

\* cited by examiner

METHOD AND SYSTEM FOR SHARING CONTENT ON INSTANT MESSAGING APPLICATION DURING CALLS

CROSS-REFERENCE TO RELATED APPLICATION

This application is based on and claims priority under 35 U.S.C § 119 to Korean Patent Application No. 10-2021-0106161, filed on Aug. 11, 2021, in the Korean Intellectual Property Office, the contents of which are incorporated herein by reference in its entirety.

BACKGROUND

1. Field

The present disclosure relates generally to a method and a system for sharing a content on an instant messaging application during a call, and more particularly, to a method and a system for enabling participants to view one of shared contents in a chat room during a call on an instant messaging application while continuing the call.

2. Description of the Related Art

With the proliferation of mobile devices such as smartphones and the like, instant messaging applications are widely used for communication among people. Users of the instant messaging applications on their mobile devices may send and receive messages with a large number of other users. In particular, the user may upload and share pictures, web pages, videos, or the like related to a message through the chat room of the instant messaging application.

Recently, services are widely distributed, which utilize easy accessibility of the instant messaging application to make a call to another user participating in the same chat room. When using the call service through the chat room, there is a high frequency of conversations about topics discussed in or uploaded to the chat room. However, there is inconvenience in that it is not easy to view the content uploaded to the chat room during a call together with the chat partners.

SUMMARY

Provided are a method for, a non-transitory computer-readable recording medium storing instructions for, an apparatus, and system for sharing a content during a call.

According to an aspect of the disclosure, a method for sharing content performed by at least one processor of a first user terminal may include initiating, through a first external device, a call between a first user account associated with the first user terminal and a second user account associated with a second user terminal included in a chat room of an instant messaging application, transmitting a co-view request associated with a content to share to the first external device, where the content to share is one of a plurality of contents shared within the chat room, and displaying the content to share with a call screen on a display of the first user terminal.

The content to share may be displayed in synchronization on the display of the first user terminal and on a display of the second user terminal.

The co-view request may include identification information of the content to share, and the second user terminal may be configured to receive the identification information of the content to share from the first external device.

The method may include, in response to determining that the content to share is not stored in the first user terminal, transmitting the identification information of the content to share to a second external device, and receiving the content to share from the second external device.

The second user terminal may be configured to receive the content to share from the second external device by using the identification information of the content to share received through the first external device, and display the received content on the display of the second user terminal together with the call screen.

Transmitting the co-view request may include displaying a list of the plurality of contents shared in the chat room on the display of the first user terminal, and receiving a selection for one of the plurality of contents.

The list of the plurality of contents shared in the chat room may include previews associated with the plurality of contents, and the previews associated with the plurality of contents may be received from a second external device.

The plurality of contents in the list may be sorted and displayed in oldest-to-newest order.

The plurality of contents in the list may be sorted and displayed in an order of high similarity to a call topic.

The call topic may be determined by analyzing call data for a predetermined time.

The method may further include displaying, among the plurality of contents shared in the chat room, a content that has the highest similarity to a call topic as a candidate content to share, on the display of the first user terminal with the call screen, and receiving a user input for selecting the candidate content to share as the content to share.

The call topic may be determined by analyzing call data for a predetermined time.

Information on a user who uploaded the candidate content to share to the chat room, or information on a time when the candidate content to share is uploaded to the chat room may be displayed on the display of the first user terminal with a preview associated with the candidate content to share.

The method may further include receiving a request for control on the content to share from a user, and transmitting control information corresponding to the request for control to the second user terminal by the first external device.

The content to share may include music or a video, and the control information may include information on a playback position.

The content to share may include an image, and the control information may include information on enlargement or reduction.

The content to share may be a web page, and the control information may include information on a scroll position.

According to an aspect of the disclosure, a non-transitory computer-readable storage medium may store instructions that, when executed by at least one processor, cause the at least one processor to initiate, through a first external device, a call between a first user account associated with a first user terminal and a second user account associated with a second user terminal included in a chat room of an instant messaging application, transmit a co-view request associated with a content to share to the first external device, where the content to share is one of a plurality of contents shared within the chat room, and display the content to share with a call screen on a display of the first user terminal.

According to an aspect of the disclosure, a first user terminal may include a communication interface, a display, a memory storing instructions, and at least one processor configured to execute the instructions to initiate, through a first external device, a call between a first user account associated with the first user terminal and a second user account associated with a second user terminal included in a chat room of an instant messaging application, transmit a co-view request associated with a content to share to the first external device, where the content to share is one of a plurality of contents shared within the chat room, and display the content to share with a call screen on the display of the first user terminal.

The content to share may be displayed in synchronization on the display of the first user terminal and on a display of the second user terminal.

The effects of the present disclosure are not limited to the effects described above, and other effects not mentioned will be able to be clearly understood by those of ordinary skill in the art (referred to as "those skilled in the art") from the description of the claims.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION

Figure 1:
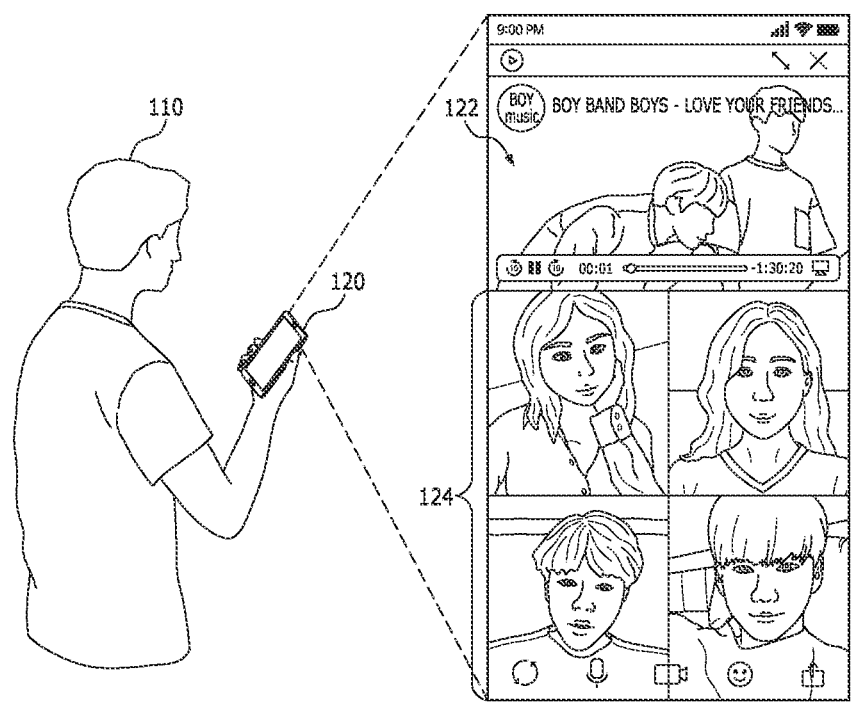
FIG. 1 is a diagram of an example in which a user uses a chat room content sharing service during a call using a user terminal according to an embodiment.

Hereinafter, specific details for the practice of the present disclosure will be described in detail with reference to the accompanying drawings. However, in the following description, detailed descriptions of well-known functions or configurations may be omitted.

In the accompanying drawings, the same or corresponding components are assigned the same reference numerals. In addition, in the following description of the embodiments, duplicate descriptions of the same or corresponding components may be omitted. However, even if descriptions of components are omitted, it is not intended that such components are not included in any embodiment.

Advantages and features of the disclosed embodiments and methods of accomplishing the same will be apparent by referring to embodiments described below in connection with the accompanying drawings. However, the present disclosure is not limited to the embodiments disclosed below, and may be implemented in various forms different from each other, and the present embodiments are merely provided to make the present disclosure complete, and to fully disclose the scope of the disclosure to those skilled in the art to which the present disclosure pertains.

The terms used herein will be briefly described prior to describing the disclosed embodiments in detail. The terms used herein have been selected as general terms which are widely used at present in consideration of the functions of the present disclosure, and this may be altered according to the intent of an operator skilled in the art, conventional practice, or introduction of new technology. In addition, in specific cases, certain terms may be arbitrarily selected by the applicant, and the meaning of the terms will be described in detail in a corresponding description of the embodiments. Therefore, the terms used in the present disclosure should be defined based on the meaning of the terms and the overall content of the present disclosure rather than a simple name of each of the terms.

As used herein, the singular forms "a," "an," and "the" are intended to include the plural forms as well, unless the context clearly indicates the singular forms. Further, the plural forms are intended to include the singular forms as well, unless the context clearly indicates the plural forms. Further, throughout the description, when a portion is stated as "comprising (including)" a component, it intends to mean that the portion may additionally comprise (or include or have) another component, rather than excluding the same, unless specified to the contrary.

Further, the term "module" or "unit" used herein refers to a software or hardware component, and "module" or "unit" performs certain roles. However, the meaning of the "module" or "unit" is not limited to software or hardware. The "module" or "unit" may be configured to be in an addressable storage medium or configured to play one or more processors. Accordingly, as an example, the "module" or "unit" may include components such as software components, object-oriented software components, class components, and task components, and at least one of processes, functions, attributes, procedures, subroutines, program code segments, drivers, firmware, micro-codes, circuits, data, database, data structures, tables, arrays, and variables. Furthermore, functions provided in the components and the "modules" or "units" may be combined into a smaller number of components and "modules" or "units", or further divided into additional components and "modules" or "units."

According to an embodiment, the "module" or "unit" may be implemented as a processor and a memory. The "processor" should be interpreted broadly to encompass a general-purpose processor, a central processing unit (CPU), a microprocessor, a digital signal processor (DSP), a controller, a microcontroller, a state machine, and so forth. Under some circumstances, the "processor" may refer to an application-specific integrated circuit (ASIC), a programmable logic device (PLD), a field-programmable gate array (FPGA), and so on. The "processor" may refer to a combination for processing devices, e.g., a combination of a DSP and a microprocessor, a combination of a plurality of microprocessors, a combination of one or more microprocessors in conjunction with a DSP core, or any other combination of such configurations. In addition, the "memory" should be interpreted broadly to encompass any electronic component that is capable of storing electronic information. The "memory" may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, and so on. The memory is said to be in electronic communication with a processor if the processor may read information from and/or write information to the memory. The memory integrated with the processor is in electronic communication with the processor.

According to various embodiments of the present disclosure, a user may receive a co-view service to view the content shared in the chat room together with another user during a call, such that that the user may quickly and easily check the videos, images, links, and the like shared in the chat room during the call, and continue the call while viewing or listening with the counterpart.

According to various embodiments of the present disclosure, by receiving a list of contents to share for co-viewing with another person in the chat room on a call in a preview form, the user may more intuitively check the corresponding contents. In addition, by receiving the candidate contents to share automatically recommended during a call, the user may more easily share the content desired for sharing with other people in the chat room.

In various embodiments of the present disclosure, the list of contents to share is sorted in an order of high similarity to the call topic or in the oldest-to-newest order based on the uploading time, so that the user may quickly find the content desired for sharing.

In various embodiments of the present disclosure, it is possible to synchronously view a desired scene in the content together with another user in the chat room, through a control by the user input with respect to the content to share.

In the present disclosure, a "chat room" may refer to a virtual space or group in which one or more users (or user accounts) may participate, which may be generated in an instant messaging application installed on a computing device. For example, one or more user accounts may participate or be included in the chat room and exchange various types of messages, files, and the like. In addition, in the chat room, a Voice over Internet Protocol (VoIP) call function, a VoIP group call function, and a live broadcast function (VoIP real-time video transmission function) are provided, so that voice calls, video calls, video streaming, and the like between user accounts in the chat room may be performed.

As used herein, the "user account" may represent an account generated and used by a user in the instant messaging application or data related thereto. In addition, the user account of the instant messaging application may refer to a user who uses the instant messaging application. Likewise, a user who uses instant messaging or a chat room capable of instant messaging may refer to the user account of the instant application. In addition, the user account may refer to a user account associated with the screen of the user terminal illustrated in the drawing. In addition, while a plurality of user accounts are used separately from the user account, the plurality of user accounts may include the user accounts.

As used herein, the "content" may include various types of information or contents such as images, texts, videos, and voices that are produced digitally in such a manner that may be recognized by human senses and provided to the user. For example, the content may include video, music, image, voice, web page, webtoon, text, SNS post, and the like, but is not limited thereto.

FIG. 1 is a diagram of an example in which a user 110 uses a chat room content sharing service during a call using a user terminal according to an embodiment. As illustrated, the user 110 may initiate a call with other users through a chat room of an instant messaging application. While FIG. 1 illustrates that the user 110 is in a video call with other users, embodiments are not limited thereto, and the user 110 may initiate a voice call with other users through the chat room of the instant messaging application. In addition, while FIG. 1 illustrates that the user 110 is in a call with a plurality of other users, embodiments are not limited thereto, and the user 110 may make a call with any number of other users.

During a call, the user 110 may request to co-view a content to share (or request to share the content). In an embodiment, in response to the user 110 selecting a co-view icon displayed on a display through a touch input or the like, contents shared in a chat room of an ongoing call may be displayed on the screen. In this case, the user 110 may select one of the shared contents of the chat room displayed on the screen to request to co-view the corresponding content. Alternatively or additionally, in response to the user 110 selecting a recommendation message of a candidate content to share displayed on the display through a touch input or the like, a co-view request for the corresponding content may be made. In this case, the candidate content to share may be one of contents shared in the chat room of the ongoing call.

In response to the co-view request, a content 122 to share may be displayed together with a call screen 124 on the display of the user terminal. Alternatively, only the content 122 to share may be displayed on the display. The content 122 to share may be displayed in synchronization with user terminals of users who are on the call.

In FIG. 1, while the content 122 to share is illustrated as a video, embodiments are not limited thereto. For example, the content 122 to share may be image, music, web page, webtoon, and the like. With such a configuration, the user may quickly and easily check the video, image, link, and the like shared in the chat room during the call, and continue the call while viewing or listening with the others.

Figure 2:
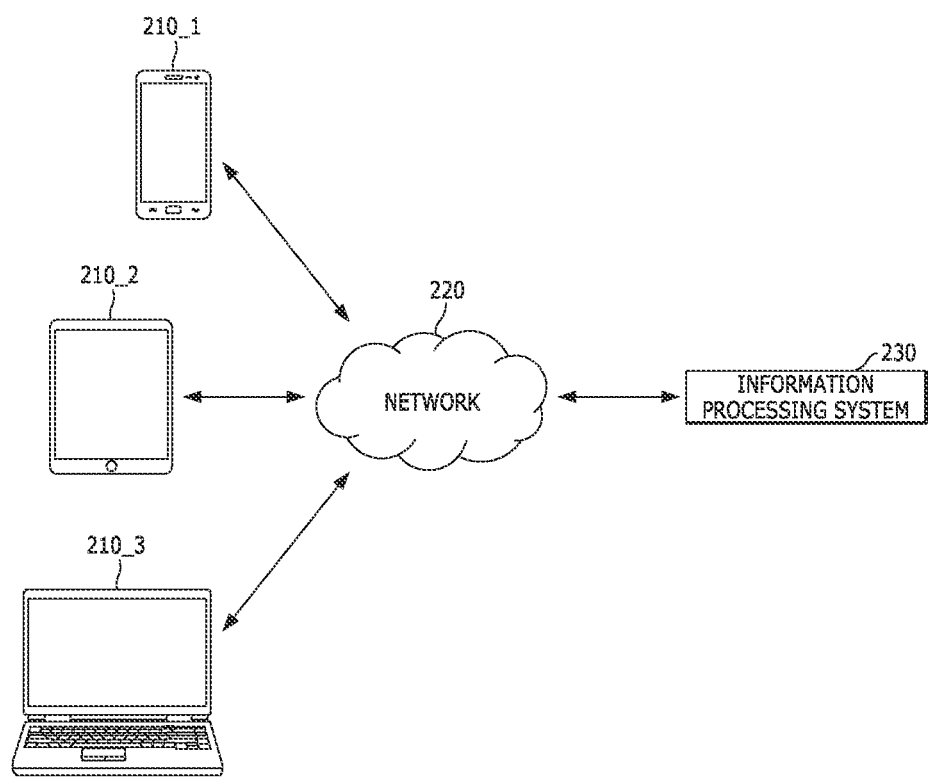
FIG. 2 is a diagram illustrating a configuration in which an information processing system is communicatively connected to a plurality of user terminals in order to provide the chat room content sharing service during a call according to an embodiment.

FIG. 2 is a diagram illustrating a configuration in which an information processing system 230 is communicatively connected to a plurality of user terminals 210_1, 210_2, and 210_3 to provide a chat room content sharing service during a call according to an embodiment. The information processing system 230 may include a system capable of providing a plurality of user terminals 210_1, 210_2, and 210_3 with an instant messaging service including a content sharing service during a call through a network 220. According to an embodiment, the information processing system 230 may include one or more server devices and/or databases, or one or more distributed computing devices and/or distributed databases based on cloud computing services that may store, provide and execute computer-executable programs (e.g., downloadable applications) and data related to the instant messaging service. The instant messaging service provided by the information processing system 230 may be provided to the user through the instant messaging application installed in each of the plurality of user terminals 210_1, 210_2 and 210_3. For example, the instant messaging service may include a text messaging service, a video call service, a voice call service, a video streaming service, a screen sharing service, a content sharing service, and the like between users of the instant messaging application.

The plurality of user terminals 210_1, 210_2, and 210_3 may communicate with the information processing system 230 through the network 220. The network 220 may be configured to enable communication between the plurality of user terminals 210 and the information processing system 230. The network 220 may be configured as a wired network 220 such as Ethernet, a wired home network (Power Line Communication), a telephone line communication device and RS-serial communication, a wireless network 220 such as a mobile communication network, a wireless local area network (WLAN), Wi-Fi, Bluetooth, and ZigBee, or a combination thereof, depending on the installation environment. The method of communication may include a communication method using a communication network (e.g., mobile communication network, wired Internet, wireless Internet, broadcasting network, satellite network, and the like) that may be included in the network 220 as well as short-range wireless communication between the user terminals 210_1, 210_2, and 210_3, but embodiments are not limited thereto. For example, the network 220 may include any one or more of networks including a personal area network (PAN), a local area network (LAN), a campus area network (CAN), a metropolitan area network (MAN), a wide area network (WAN), a broadband network (BBN), the Internet, and the like. In addition, the network 220 may include any one or more of network topologies including a bus network, a star network, a ring network, a mesh network, a star-bus network, a tree or hierarchical network, and the like, but not limited thereto.

In FIG. 2, a mobile phone terminal 210_1, a tablet terminal 210_2, and a personal computer (PC) terminal 210_3 are illustrated as the examples of the user terminals, but are not limited thereto, and the user terminals 210_1, 210_2, and 210_3 may be any computing device that is capable of wired and/or wireless communication and that may be installed with the instant messaging application and execute the same. For example, the user terminal may include a smartphone, a mobile phone, a navigation system, a computer, a notebook computer, a digital broadcasting terminal, Personal Digital Assistants (PDA), a Portable Multimedia Player (PMP), a tablet PC, a game console, a wearable device, an internet of things (IoT) device, a virtual reality (VR) device, an augmented reality (AR) device, and the like. In addition, while FIG. 2 illustrates three user terminals 210_1, 210_2, and 210_3 in communication with the information processing system 230 through the network 220, embodiments are not limited thereto, and accordingly, a different number of user terminals 210_1, 210_2, and 210_3 may be configured to be in communication with the information processing system 230 through the network 220.

The information processing system 230 may receive a co-view request associated with the content to share by the user account in the chat room from the user terminals 210_1, 210_2, and 210_3 on which the instant messaging application is operated. When the co-view request is received, the information processing system 230 may provide the content sharing service (or a co-view service) and a call service together between the user terminals 210_1, 210_2, and 210_3 on which the instant messaging application is operated.

According to an embodiment, in order to provide the content sharing service during a call, the information processing system 230 may receive information on the content to share (e.g., identification information on the content to share, and the like) from the user terminals 210_1, 210_2, and 2103 that provides the shared content, and transmit the received information on the content to share to the user terminals 210_1, 210_2, and 210_3 that receive the shared content. In an example, the content to share may include a type of content that may be shared and/or link information associated with this type of content. For example, when receiving the co-view request, the information processing system 230 may receive the information on the content to share from a user terminal of a user account that intends to share the content, and transmit the received information on the content to share to the user terminals of a plurality of user accounts associated with the chat room. That is, the information on the content to share may be shared with a plurality of user accounts associated with the chat room through the chat room.

Figure 3:
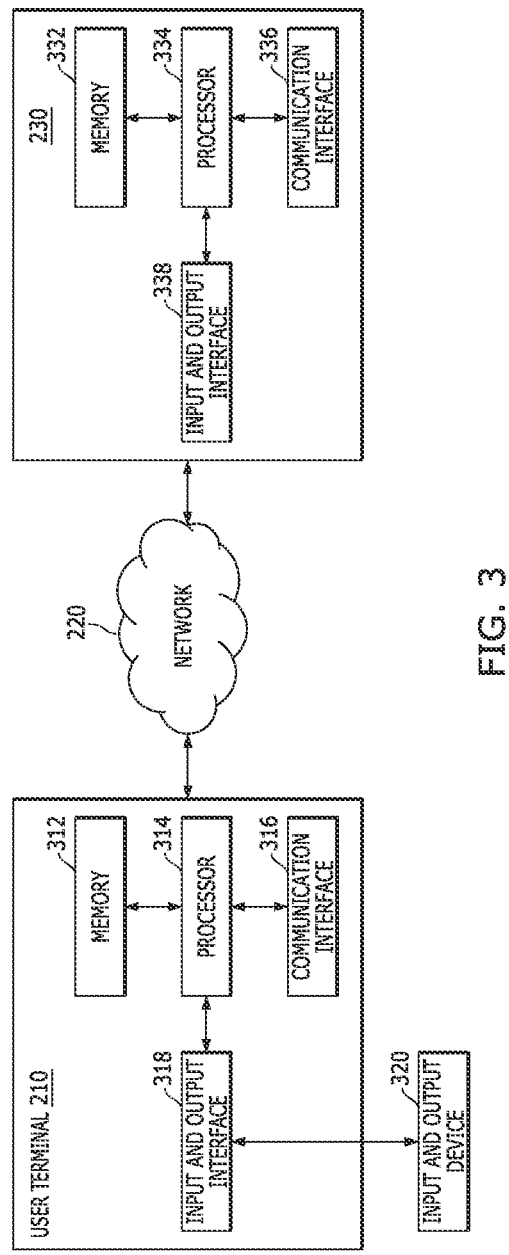
FIG. 3 is a diagram illustrating an internal configuration of the user terminal and the information processing system according to an embodiment.

FIG. 3 is a diagram illustrating an internal configuration of the user terminal 210 and the information processing system 230 according to an exemplary embodiment. The user terminal 210 may refer to any computing device that is capable of executing the instant messaging application and also capable of wired/wireless communication, and may include the mobile phone terminal 210_1, the tablet terminal 210_2, and the PC terminal 210_3 of FIG. 2, for example. As illustrated, the user terminal 210 may include a memory 312, a processor 314, a communication interface 316, and an input and output interface 318. Likewise, the information processing system 230 may include a memory 332, a processor 334, a communication interface 336, and an input and output interface 338. As illustrated in FIG. 3, the user terminal 210 and the information processing system 230 may be configured to communicate information and/or data through the network 220 using the respective communication interfaces 316 and 336. In addition, an input and output device 320 may be configured to input information and/or data to the user terminal 210 or to output information and/or data generated from the user terminal 210 through the input and output interface 318.

The memories 312 and 332 may include any non-transitory computer-readable recording medium. According to an embodiment, the memories 312 and 332 may include a permanent mass storage device such as RAM, ROM, disk drive, solid state drive (SSD), flash memory, and so on. As another example, a non-destructive mass storage device such as ROM, SSD, flash memory, disk drive, and so on may be included in the user terminal 210 or the information processing system 230 as a separate permanent storage device that is separate from the memory. In addition, an operating system and at least one program code (e.g., a code for the instant messaging application, and the like installed and driven in the user terminal 210) may be stored in the memories 312 and 332.

These software components may be loaded from a computer-readable recording medium separate from the memories 312 and 332. Such a separate computer-readable recording medium may include a recording medium directly connectable to the user terminal 210 and the information processing system 230, and may include a computer-readable recording medium such as a floppy drive, a disk, a tape, a digital versatile disc (DVD)/compact disc (CD) ROM (CD-ROM) drive, a memory card, and so on, for example. As another example, the software components may be loaded into the memories 312 and 332 through the communication interfaces rather than the computer-readable recording medium. For example, at least one program may be loaded into the memories 312 and 332 based on a computer program (for example, an application that provides instant messaging application services) installed by files provided by the developers or a file distribution system for distributing an installation file of the application through the network 220.

The processors 314 and 334 may be configured to process the instructions of the computer program by performing basic arithmetic, logic, and input and output operations. The instructions may be provided to the processors 314 and 334 from the memories 312 and 332 or the communication interfaces 316 and 336. For example, the processors 314 and 334 may be configured to execute the received instructions according to program code stored in a recording device such as the memories 312 and 332.

The communication interfaces 316 and 336 may provide a configuration or function for the user terminal 210 and the information processing system 230 to communicate with each other through the network 220, and may provide a configuration or function for the user terminal 210 and/or the information processing system 230 to communicate with another user terminal or another system (e.g., a separate cloud system, a separate content sharing system, a content providing system, a separate call system, and the like). For example, a request (e.g., a request to initiate a call, a request to share content) generated by the processor 314 of the user terminal 210 according to the program code stored in the recording device such as the memory 312 or the like may be transmitted to the information processing system 230 through the network 220 under the control of the communication interface 316. Conversely, a control signal or a command provided under the control of the processor 334 of the information processing system 230 may be received by the user terminal 210 through the communication interface 316 of the user terminal 210 through the communication interface 336 and the network 220. For example, the user terminal 210 may receive from the information processing system 230 through the communication interface 316 a result of determining whether or not there is the content to share.

The input and output interface 318 may be a means for interfacing with the input and output device 320. As an example, the input device may include a device such as a camera including an image sensor, a keyboard, a microphone, a mouse, and so on, and the output device may include a device such as a display, a speaker, a haptic feedback device, and so on. As another example, the input and output interface 318 may be a means for interfacing with a device such as a touch screen or the like that integrates a configuration or function for performing inputting and outputting. For example, when the processor 314 of the user terminal 210 processes the instructions of the computer program loaded in the memory 312, a service screen or content, which is configured with the information and/or data provided by the information processing system 230 or another user terminal 210, may be displayed on the display through the input and output interface 318. While FIG. 3 illustrates that the input and output device 320 is not included in the user terminal 210, embodiments are not limited thereto, and an input and output device may be configured as one device with the user terminal 210. In addition, the input and output interface 338 of the information processing system 230 may be a means for interfacing with a device for inputting or outputting that may be connected to, or included in the information processing system 230. While FIG. 3 illustrates the input and output interfaces 318 and 338 as the components configured separately from the processors 314 and 334, embodiments are not limited thereto, and the input and output interfaces 318 and 338 may be configured to be included in the processors 314 and 334.

The user terminal 210 and the information processing system 230 may include more than those components illustrated in FIG. 3. Meanwhile, most of the related components may not necessarily require exact illustration. According to an embodiment, the user terminal 210 may be implemented to include at least a part of the input and output device 320 described above. In addition, the user terminal 210 may further include other components such as a transceiver, a Global Positioning System (GPS) module, a camera, various sensors, a database, and the like. For example, when the user terminal 210 is a smartphone, it may include components generally included in the smartphone. For example, in an implementation, various components such as an acceleration sensor, a gyro sensor, a camera module, various physical buttons, buttons using a touch panel, input and output ports, a vibrator for vibration, and so on may be further included in the user terminal 210.

According to an embodiment, the processor 314 of the user terminal 210 may be configured to operate the instant messaging application or web browser application which provides the instant messaging service including the content sharing service during a call. In this case, a program code associated with the application may be loaded into the memory 312 of the user terminal 210. While the application is running, the processor 314 of the user terminal 210 may receive information and/or data provided from the input and output device 320 through the input and output interface 318 or receive information and/or data from the information processing system 230 through the communication interface 316, and process the received information and/or data and store it in the memory 312. In addition, such information and/or data may be provided to the information processing system 230 through the communication interface 316.

While the instant messaging application is running, the processor 314 may receive texts, images, and the like, which may be inputted or selected through the input and output device 320 such as a touch screen, a keyboard, and the like connected to the input and output interface 318, and store the received texts, and/or images in the memory 312 or provide them to the information processing system 230 through the communication interface 316 and the network 220. For example, the processor 314 may receive information on the request to share content, a request to initiate a video call, and the like, through an input device such as a touch screen or a keyboard. Accordingly, the received request and/or information may be provided to the information processing system 230 through the communication interface 316 and the network 220.

The processor 314 of the user terminal 210 may be configured to manage, process, and/or store the information and/or data received from the input and output device 320, another user terminal, the information processing system 230 and/or a plurality of external systems. The information and/or data processed by the processor 314 may be provided to the information processing system 230 through the communication interface 316 and the network 220. The processor 314 of the user terminal 210 may transmit the information and/or data to the input and output device 320 through the input and output interface 318 to output the same. For example, the processor 314 may display the received information and/or data on a screen of the user terminal.

The processor 334 of the information processing system 230 may be configured to manage, process, and/or store information and/or data received from the plurality of user terminals 210 and/or a plurality of external systems. The information and/or data processed by the processor 334 may be provided to the user terminals 210 through the communication interface 336 and the network 220. While FIG. 3 illustrates the information processing system 230 as a single system, embodiments are not limited thereto, and it may include a plurality of systems and servers for providing various services association with the instant messaging service. For example, the information processing system 230 may include a messenger server, a call server, a media server, and the like.

Figure 4:
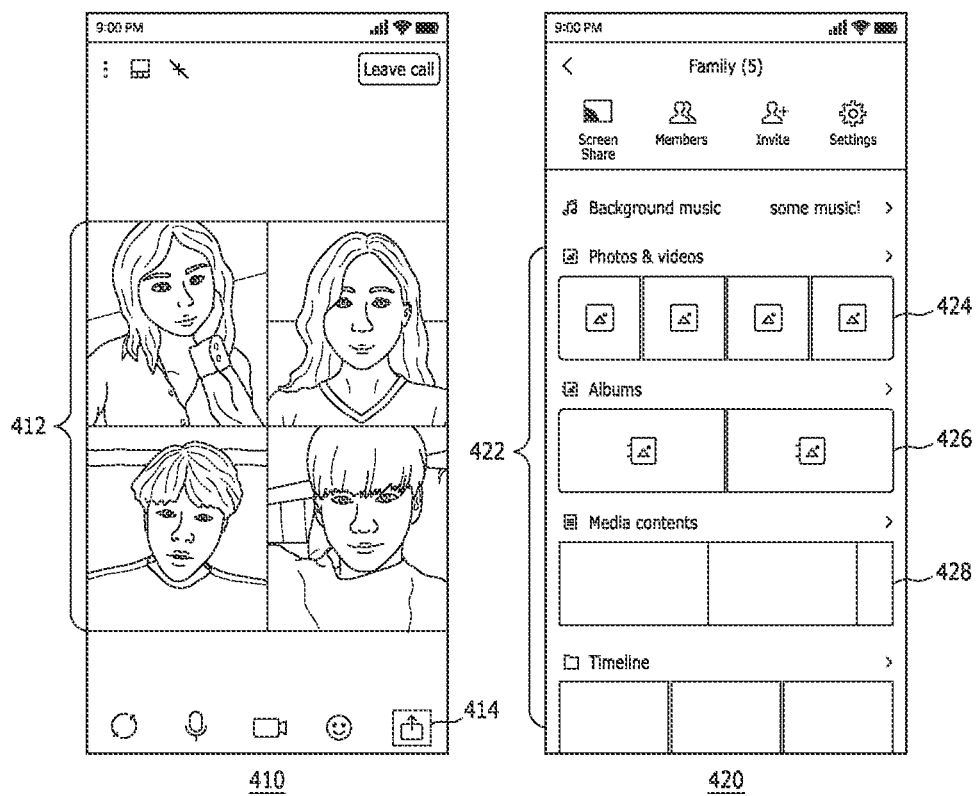
FIG. 4 is a diagram of an example of displaying on a display a list of a plurality of contents shared in a chat room upon a co-view request with respect to a content to share according to an embodiment.

FIG. 4 is a diagram of an example of displaying on a display a list 422 of a plurality of contents shared in a chat room upon a co-view request with respect to a content to share according to an embodiment. As illustrated, through the first and second operations 410 and 420, the user may display the list 422 of a plurality of contents shared in the chat room on the display and select a content to view together with the counterpart during a call on the instant application. In an embodiment, the user may initiate a video call or voice call with user(s) included in a 1:1 chat room or a group chat room on the instant application.

The first operation 410 represents an example in which the user selects a co-view request icon 414 displayed at the bottom of the display by a touch input or the like during a call. For example, when a group call of four people is initiated, the call screen 412 may be displayed on the display, and the co-view request icon 414 may be displayed at the bottom of the display. The user may select the co-view request icon 414 in order to view the content shared in the chat room during the call together with other people in the chat room during the call.

The second operation 420 represents an example in which the list 422 of a plurality of contents shared in the chat room including users who are on a call is displayed on the display in response to the user selecting the co-view request icon. The list 422 of the plurality of contents may include a preview, an upload date, a content title, information on uploading user, and the like associated with content shared in the chat room of the ongoing call. In this case, the preview may be provided in the form of a thumbnail or preview of the content. In this case, the form of the preview associated with the content included in the list 422 of the plurality of contents may be determined by the type of content or the category into which the content is classified. In addition, the previews association with content included in the list 422 of a plurality of contents may be classified according to the type or category of the contents and provided. One or more previews association with the content may be provided according to each type or category of the contents. The preview included in the list 422 of the plurality of contents may be received from an external device (e.g., a messenger server or a media server).

In an embodiment, the plurality of contents in the list 422 may be sorted in oldest-to-newest order based on the uploaded time and displayed. In another embodiment, the plurality of contents in the list 422 may be displayed in an order of high similarity to the call topic. For example, when a call is ongoing between users, the user terminal or the external device (e.g., messenger server, media server, call server, and the like) may analyze call data to detect a call topic (or keyword), determine a similarity between the detected call topic (or keyword) and the contents shared in the chat room, and first display the content with a high similarity. In this case, the call topic and/or keyword may be determined by analyzing the call data for a predetermined time, and may be continuously changed and/or updated as the call progresses.

In an embodiment, the list 422 of the plurality of contents may be classified and displayed according to categories. For example, it may be classified and displayed into image and/or video content 424, image and/or video content 426 stored as an album, media content 428, social networking service (SNS) posts, web pages/webtoons linked to a uniform resource locator (URL) (link information) shared in the chat room, and the like. The criterion for the classification of the contents in the list 422 of the plurality of contents are not limited to the above examples, and may further include various contents categories such as music, voice messages, specific web pages, and so on.

Figure 5:
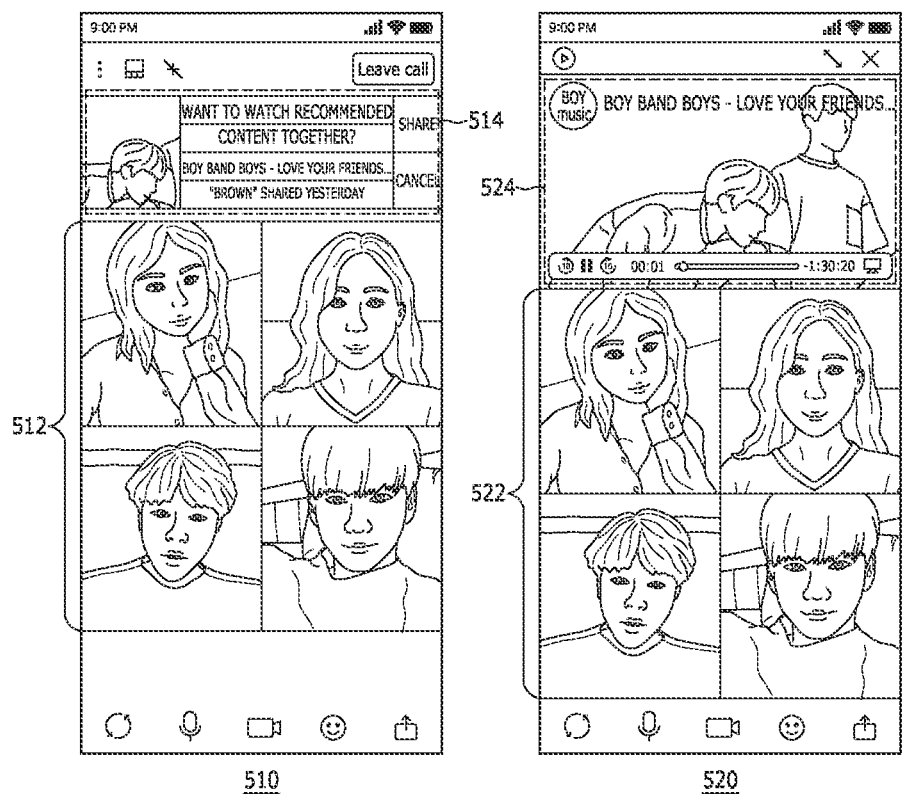
FIG. 5 is a diagram of an example of automatically recommending a shared content of chat room that has the highest similarity to a topic of a call as a candidate content to share according to an embodiment.

FIG. 5 is a diagram of an example of automatically recommending a shared content of chat room that has the highest similarity to the topic of the call as a candidate content to share according to an embodiment. As illustrated, through the first and second operations 510 and 520, the user may select a candidate content 514 to share that is automatically recommended during a call as the content, so as to share and conduct a call while viewing it with the counterpart.

The first operation 510 shows an example in which (n) number of contents (where, n is a natural number) with the highest similarity to the call topic among a plurality of contents shared in the chat room are displayed as the candidate content 514 to share on the display together with a call screen 512 during the call. For example, one content that has the highest similarity among the contents uploaded within a specific period (e.g., one week) may be determined to be the candidate content 514 to share. Additionally or alternatively, one or more contents having a similarity equal to or greater than a predefined threshold may be determined to be the candidate content 514 to share. In an embodiment, preview associated with the candidate content 514 to share, information on uploading user (e.g., Brown) who uploaded the content to the chat room, information on time of uploading to the shared chat room (e.g., Yesterday), title (e.g., Boy band BOYS—LOVE YOUR FRIENDS), and the like may be displayed on the display to be used as a reference for the user to determine whether to continue the call while viewing together with other users.

The second operation 520 illustrates an example in which a content 524 to share is displayed together with a call screen 522 on the display of the user terminal, in response to the user selecting the candidate content to share as the content to share. Alternatively, only the content 524 to share may be displayed on the display. The content 524 to share may be displayed in synchronization with the user terminals of the users who are on a call. In FIG. 5, while the content 524 to share is illustrated as a video, embodiments are not limited thereto. For example, the content 524 to share may be image, music, web page, webtoon, and the like.

Figure 6:
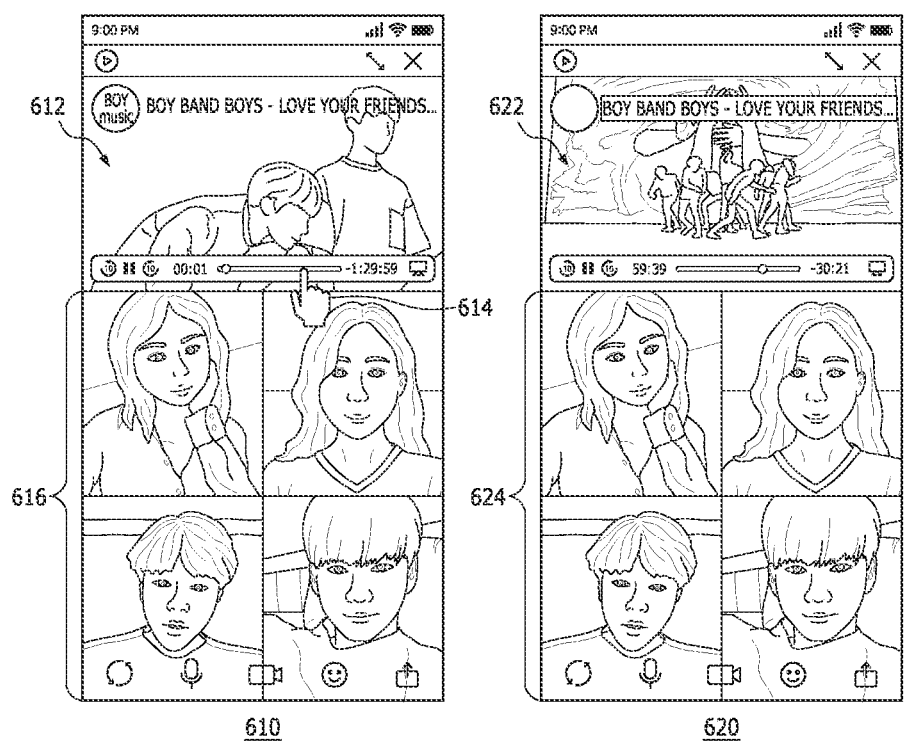
FIG. 6 is a diagram of an example in which a video is displayed in synchronization on counterpart terminals of call participants based on content control information according to an embodiment.

FIG. 6 is a diagram of an example in which a video is displayed in synchronization on the counterpart terminals of call participants based on content control information according to an embodiment. As illustrated, through the first and second operations 610 and 620, the user may make a request for a control on the content to share, so as to view the shared content of a same playback position together with a plurality of counterparts.

The first operation 610 represents an example in which the user controls the playback position of a video content 612 to share through a user input 614. For example, while the video content 612 is being displayed in synchronization with the displays of a plurality of user terminals participating in the call, the user may perform the user input 614 to change the playback position on a playback control bar provided by the instant messaging application to another playback position.

The second operation 620 represents an example in which the playback position of a video content 622 to share is changed to another playback position in response to the user input 614. In this case, the screens of the other users may be synchronized such that the video content 622 to share may be played at the changed playback position. While FIG. 6 illustrates the contents 612 and 622 to share as the video contents, embodiments are not limited thereto, and it may be any content (e.g., music content) having a playback position. In addition, while FIG. 6 illustrates call screens 616 and 624 as the video call screens, embodiments are not limited thereto. For example, when a voice call is in progress, the call screens 616 and 624 may not be displayed.

Figure 7:
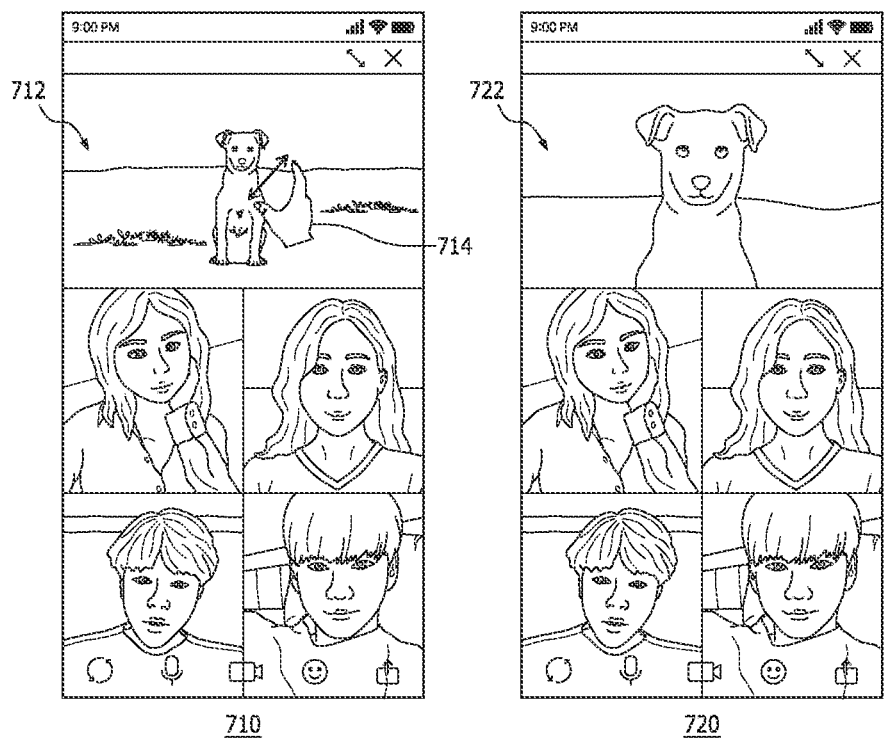
FIG. 7 is a diagram of an example in which enlargement or reduction of the image is synchronized on the counterpart terminal based on content control information according to an embodiment.

FIG. 7 is a diagram of an example in which enlargement or reduction of the image is synchronized on the counterpart terminal based on content control information according to an embodiment. As illustrated, through the first and second operations 710 and 720, the user makes a request for a control on the content to share, so as to enlarge, reduce, or move the content such as image and the like and view the result together with a plurality of counterparts.

The first operation 710 represents an example in which the user controls by enlarging an image content 712 to share through a user input 714. For example, while the image content 712 to share is being displayed in synchronization with the displays of a plurality of user terminals participating in the call, the user may perform the user input 714 to enlarge, reduce, or move the image content 712 to share.

The second operation 720 represents an example in which an image content 722 to share is enlarged and displayed in response to the user's request for enlargement control of the image. In this case, the screens of the other users may be synchronized such that the image content 722 to share may be displayed. While FIG. 7 illustrates an example in which the image is enlarged in synchronization, embodiments are not limited thereto, and any content (e.g., video, web page, webtoon, and the like) that may be enlarged and reduced in size, moved, and the like on the screen by dragging, pinching, and the like may be displayed in synchronization with a plurality of user terminals.

Figure 8:
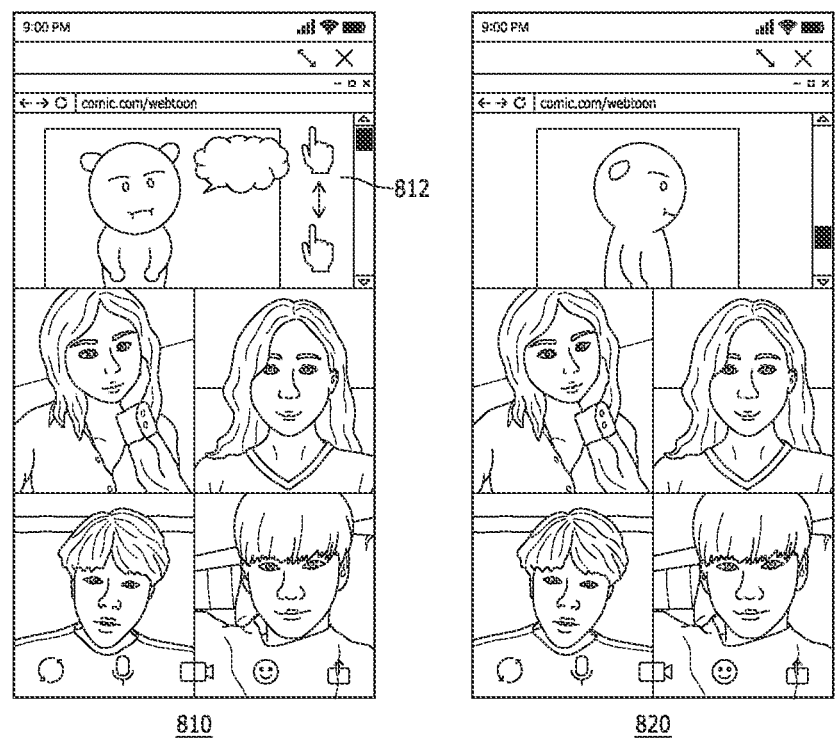
FIG. 8 is a diagram of an example in which a scroll position of a web page is synchronized on the counterpart terminal based on content control information according to an embodiment.

FIG. 8 is a diagram of an example in which a scroll position of a web page is synchronized on the counterpart terminal based on content control information according to an embodiment. As illustrated, through the first and second operations 810 and 820, the user may make a request for a control on the content to share, so as to synchronize scroll positions of a web page and view the content to share together with a plurality of counterparts.

The first operation 810 illustrates an example in which the user controls the scroll position of a web page to share through a user input 812. For example, while the web page to share is displayed in synchronization with the displays of a plurality of user terminals participating in the call, the user may scroll the web page to share through the user input 812 such as dragging and the like.

The second operation 820 represents an example in which the scroll position of the web page to share is changed and displayed in response to the user's request for movement control of the scroll position of the web page. In this case, the screens of other users may be synchronized such that the web page to share may be scrolled and displayed. While FIG. 8 illustrates an example in which the scroll position of the web page is changed, embodiments are not limited thereto, and any content that the scroll position may be moved may be displayed in synchronization with a plurality of user terminals.

Figure 9:
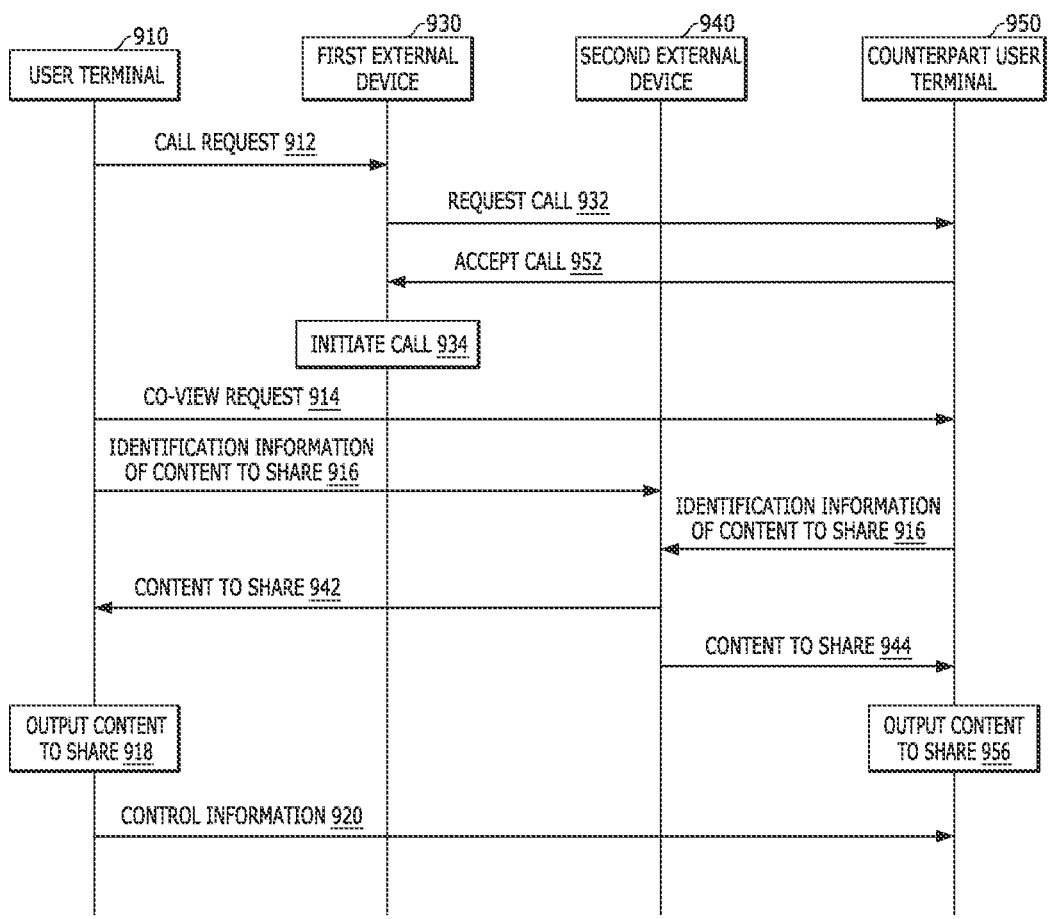
FIG. 9 is a flowchart of a method for sharing a content during a call between a user terminal, a first external device, a second external device, and a counterpart user terminal according to an embodiment.

FIG. 9 is a flowchart of a method for sharing a content during a call between a user terminal 910, a first external device 930, a second external device 940, and a counterpart user terminal 950 according to an embodiment. In an embodiment, the user terminal 910 and the counterpart user terminal 950 may be user terminals associated with a user account included in the same chat room of the instant messaging application. The first external device 930 may refer to a system (e.g., a messenger server and a call server) that provides an instant messaging service between users included in the chat room, receives a call request from the user terminal 910, initiates a call with the counterpart user terminals 950 included in the same chat room, and transmits and receives call data. In this case, the first external device may be configured as a single server or a plurality of servers, and in the latter case, the messenger server and the call server may be configured as separate servers, respectively.

The second external device 940 may refer to a system (e.g., a media server, and the like) that stores contents such as text, images, videos, and the like uploaded to the chat room of the instant messaging application. In another example, the second external device 940 may refer to a media streaming system, an SNS system, and the like, which may be operated and/or managed by a third party different from the subject that provides the instant messaging service. In an embodiment, the subject providing the instant messaging service and the subject providing the media streaming service, SNS, and the like may be the same person. While FIG. 9 illustrates the first external device 930 and the second external device 940 as separate components, embodiments are not limited thereto, and the first external device 930 and the second external device 940 may be integrally configured into one system.

As illustrated, the first external device 930 may receive a call request 912 from the user terminal 910. The call request 912 may include information on a counterpart user account and/or a counterpart user terminal 950. The first external device 930 may transmit a call request 932 to the counterpart user terminal 950 included in the call request of the user terminal 910. Next, the first external device 930 may receive call acceptance 952 information from the counterpart user terminal 950 where the call request is received. In response to receiving the call acceptance 952 information, the first external device 930 may initiate 934 a call between the user terminal 910 and the counterpart user terminal 950. When the call is initiated, a data channel is generated, such that the user terminal 910 and the counterpart user terminal 950 may exchange data (e.g., call data, content sharing related data) through the first external device 930.

Then, the user terminal 910 may transmit a co-view request 914 associated with the content to share to the counterpart user terminal 950 through the first external device 930. Alternatively or additionally, the user terminal 910 may directly transmit the co-view request 914 associated with the content to share to the counterpart user terminal 950. In this case, the content to share may be one of the contents shared in the chat room where both the user account associated with the user terminal 910 and the user account associated with the counterpart user terminal 950 are included. For example, the content to share may be determined in response to the user selecting one of previews (e.g., thumbnails) of the content shared in the chat room received from the second external device 940. In an embodiment, the co-view request 914 may include identification information of the content to share. Selecting the content to share may be performed as described above with reference to FIGS. 4 and 5.

In an embodiment, after the user terminal 910 transmits the co-view request 914 to the counterpart user terminal 950, co-viewing of the content to share may be performed without requiring confirmation of the counterpart user. Alternatively, co-viewing of the content to share may be performed when the co-view request is accepted by the counterpart user terminal 950. When co-viewing of the content to share is initiated, the user terminal 910 transmits the identification information 916 of the content to share to the second external device 940, and receive a content 942 to share associated with the identification information 916 of the content to share from the second external device 940. For example, in response to determining that the content to share is not stored in the user terminal 910, the identification information 916 of the content to share may be transmitted to the second external device 940 so as to receive the content 942 to share. Alternatively, in response to determining that the content 942 to share is stored in the user terminal 910, data stored in the internal memory or the like may be used without receiving data from the second external device 940. Alternatively, when co-viewing of the content to share is initiated, the user terminal 910 transmits the identification information 916 of the content to share to the first external device 930, and receive the content 942 to share associated with the identification information 916 of the content to share from the first external device 930.

Likewise, the counterpart user terminal 950 may also transmit the identification information 916 of the content to share to the second external device 940, and receive a content 944 to share associated with the identification information 916 of the content to share from the second external device 940. In this case, the content 942 to share and the content 944 to share may be the same data. In addition, the user terminal 910 and the counterpart user terminal 950 may output (918 and 956) the same content 942 and 944 to share on the display. In this case, the content to share may be displayed on the display together with the call screen. Alternatively, the counterpart user terminal 950 may also transmit the identification information 916 of the content to share to the first external device 930, and receive the content 944 to share associated with the identification information 916 of the content to share from the first external device 930.

While outputting the shared content in synchronization on the display of the user terminal 910 and the counterpart user terminal 950, in response to receiving the request for control on the shared content from the user, the user terminal 910 may transmit control information 920 to the counterpart user terminal 950 through the first external device 930. In this case, when the content to share is music or a video, the control information 920 may include information on a playback position. Alternatively, when the content to share is an image, the control information 920 may include information on enlargement, reduction, or movement of the image. Alternatively, when the content to share is a web page, a webtoon, or the like, the control information 920 may include information on a scroll position. The counterpart user terminal 950 may receive the control information 920 and display the content to share synchronized with the user terminal 910 on the display.

Figure 10:
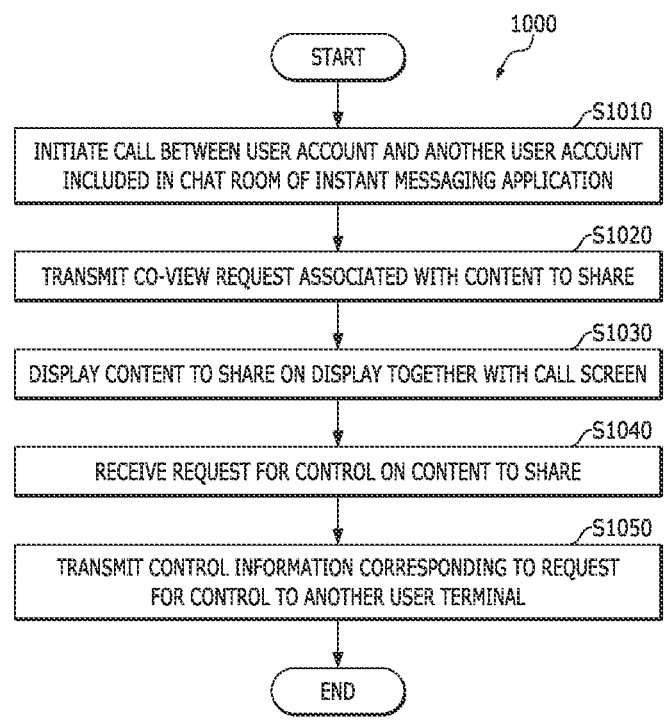
FIG. 10 is a flowchart of a method for sharing a content during a call according to an embodiment.

FIG. 10 is a flowchart of a method 1000 for sharing a content during a call according to an embodiment. The method 1000 may be performed by at least one processor of the user terminal. As illustrated, in operation S1010, the processor may initiate a call between the user account associated with the user terminal and another user account associated with another user terminal included in the chat room of the instant messaging application through the first external device.

While the call between the user account and the other user account is in progress, the processor may transmit a co-view request associated with the content to share selected by the user to the first external device, in operation S1020. In this case, the content to share may be one of a plurality of contents shared within the chat room. In addition, the co-view request may include identification information of the content to share, and another user terminal may receive the identification information of the content to share through the first external device.

In an embodiment, in response to determining that the content to share is not stored in the user terminal, the processor may transmit the identification information of the content to share to the second external device, and receive the content to share from the second external device. The other user terminal may receive the content to share from the second external device by using the identification information of the content to share received through the first external device. Then, the processor may display the content to share on the display of the user terminal together with the call screen, in operation S1030. In this case, the content to share may be displayed in synchronization on the display of the user terminal and on the display of another user terminal. In response to receiving the request for control on the content to share from the user in operation S1040, the processor may transmit the control information corresponding to the request for control to another user terminal through the first external device, in operation S1050.

The method described above may be provided as a computer program stored in a computer-readable recording medium for execution on a computer. The medium may be a type of medium that continuously stores a program executable by a computer, or temporarily stores the program for execution or download. In addition, the medium may be a variety of recording means or storage means having a single piece of hardware or a combination of several pieces of hardware, and is not limited to a medium that is directly connected to any computer system, and accordingly, may be present on a network in a distributed manner. An example of the medium includes a medium configured to store program instructions, including a magnetic medium such as a hard disk, a floppy disk, and a magnetic tape, an optical medium such as a CD-ROM and a DVD, a magnetic-optical medium such as a floptical disk, and a ROM, a RAM, a flash memory, and so on. In addition, other examples of the medium may include an app store that distributes applications, a site that supplies or distributes various software, and a recording medium or a storage medium managed by a server.

The methods, operations, or techniques of the present disclosure may be implemented by various means. For example, these techniques may be implemented in hardware, firmware, software, or a combination thereof. Those skilled in the art will further appreciate that various illustrative logical blocks, modules, circuits, and algorithm steps described in connection with the disclosure herein may be implemented in electronic hardware, computer software, or combinations of both. To clearly illustrate this interchangeability of hardware and software, various illustrative components, blocks, modules, circuits, and steps have been described above generally in terms of their functionality. Whether such a function is implemented as hardware or software varies depending on design requirements imposed on the particular application and the overall system. Those skilled in the art may implement the described functions in varying ways for each particular application, but such implementation should not be interpreted as causing a departure from the scope of the present disclosure.

In a hardware implementation, processing units used to perform the techniques may be implemented in one or more ASICs, DSPs, digital signal processing devices (DSPDs), programmable logic devices (PLDs), field programmable gate arrays (FPGAs), processors, controllers, microcontrollers, microprocessors, electronic devices, other electronic units designed to perform the functions described in the present disclosure, computer, or a combination thereof.

Accordingly, various example logic blocks, modules, and circuits described in connection with the present disclosure may be implemented or performed with general purpose processors, DSPs, ASICs, FPGAs or other programmable logic devices, discrete gate or transistor logic, discrete hardware components, or any combination of those designed to perform the functions described herein. The general purpose processor may be a microprocessor, but in the alternative, the processor may be any related processor, controller, microcontroller, or state machine. The processor may also be implemented as a combination of computing devices, for example, a DSP and microprocessor, a plurality of microprocessors, one or more microprocessors associated with a DSP core, or any other combination of the configurations.

In the implementation using firmware and/or software, the techniques may be implemented with instructions stored on a computer-readable medium, such as RAM, ROM, NVRAM, PROM, EPROM, EEPROM, flash memory, CD, magnetic or optical data storage devices, and the like. The instructions may be executable by one or more processors, and may cause the processor(s) to perform certain aspects of the functions described in the present disclosure.

When implemented in software, the techniques may be stored on a computer-readable medium as one or more instructions or codes, or may be transmitted through a computer-readable medium. The computer-readable media include both the computer storage media and the communication media including any medium that facilitates the transmit of a computer program from one place to another. The storage media may also be any available media that may be accessed by a computer. By way of non-limiting example, such a computer-readable medium may include RAM, ROM, EEPROM, CD-ROM or other optical disk storage, magnetic disk storage or other magnetic storage devices, or any other media that may be used to transfer or store desired program code in the form of instructions or data structures and may be accessed by a computer. In addition, any connection is properly referred to as a computer-readable medium.

For example, when the software is transmitted from a website, server, or other remote sources using coaxial cable, fiber optic cable, twisted pair, digital subscriber line (DSL), or wireless technologies such as infrared, wireless, and microwave, the coaxial cable, the fiber optic cable, the twisted pair, the digital subscriber line, or the wireless technologies such as infrared, wireless, and microwave are included within the definition of the medium. The disks and the discs used herein include CDs, laser disks, optical disks, DVDs, floppy disks, and Blu-ray disks, where disks usually magnetically reproduce data, while discs optically reproduce data using a laser. The combinations described above should also be included within the scope of the computer-readable media.

The software module may reside in RAM memory, flash memory, ROM memory, EPROM memory, EEPROM memory, registers, hard disk, removable disk, CD-ROM, or any other form of storage medium known. An exemplary storage medium may be connected to the processor, such that the processor may read or write information from or to the storage medium. Alternatively, the storage medium may be integrated into the processor. The processor and the storage medium may exist in the ASIC. The ASIC may exist in the user terminal. Alternatively, the processor and storage medium may exist as separate components in the user terminal.

Although the embodiments described above have been described as utilizing aspects of the currently disclosed subject matter in one or more standalone computer systems, the present disclosure is not limited thereto, and may be implemented in conjunction with any computing environment, such as a network or distributed computing environment. Furthermore, the aspects of the subject matter in the present disclosure may be implemented in multiple processing chips or devices, and storage may be similarly influenced across a plurality of devices. Such devices may include PCs, network servers, and portable devices.

Although the present disclosure has been described in connection with some embodiments herein, various modifications and changes may be made without departing from the scope of the present disclosure, which may be understood by those skilled in the art to which the present disclosure pertains. In addition, such modifications and changes should be considered within the scope of the claims appended herein.

What is claimed is:

1. A method for sharing content, the method performed by at least one processor of a first user terminal and comprising:
    initiating, through a first external device, a call between a first set of user accounts, wherein the first set of user accounts comprises a first user account associated with the first user terminal and a second user account associated with a second user terminal, wherein the first set of user accounts is a subset of a second set of user accounts, wherein the second set of user accounts is included in a chat room of an instant messaging application, and wherein the first set of user accounts is different from the second set of user accounts;
    transmitting a co-view request associated with a content to share to the first external device, wherein the content to share is one of a plurality of contents previously uploaded within the chat room including the second set of user accounts; and
    displaying the content to share with a call screen between the first set of user accounts on a display of the first user terminal,
    wherein the transmitting the co-view request comprises:
        displaying a list of the plurality of contents previously uploaded in the chat room including the second set of user accounts by the second set of user accounts on the display of the first user terminal, wherein the list comprises information on an uploading user or a time of upload to the chat room of the plurality of contents; and receiving a selection for one of the plurality of contents, and wherein the plurality of contents in the list are sorted and displayed in an order of high similarity to a call topic between the first set of user accounts, and wherein the similarity to the call topic is determined by analyzing call data for a period of time.

2. The method of claim 1, wherein the content to share is displayed in synchronization on the display of the first user terminal and on a display of the second user terminal.

3. The method of claim 1, wherein the co-view request comprises identification information of the content to share, and wherein the second user terminal is configured to receive the identification information of the content to share from the first external device.

4. The method of claim 3, further comprising:

in response to determining that the content to share is not stored in the first user terminal, transmitting the identification information of the content to share to a second external device; and receiving the content to share from the second external device.

5. The method of claim 4, wherein the second user terminal is configured to:

receive the content to share from the second external device by using the identification information of the content to share received through the first external device, and display the received content on the display of the second user terminal together with the call screen.

6. The method of claim 1, wherein the list of the plurality of contents previously uploaded in the chat room including the second set of user accounts comprises previews associated with the plurality of contents, and wherein the previews associated with the plurality of contents are received from a second external device.

7. The method of claim 1, further comprising:

receiving a request for control on the content to share from a user; and transmitting control information corresponding to the request for control to the second user terminal by the first external device.

8. The method of claim 7, wherein the content to share comprises music or a video, and wherein the control information comprises information on a playback position.

9. The method of claim 7, wherein the content to share comprises an image, and wherein the control information comprises information on enlargement or reduction.

10. The method of claim 7, wherein the content to share is a web page, and wherein the control information comprises information on a scroll position.

11. A method for sharing content, the method performed by at least one processor of a first user terminal and the method comprising:

initiating, through a first external device, a call between a first set of user accounts, wherein the first set of user accounts comprises a first user account associated with the first user terminal and a second user account associated with a second user terminal, wherein the first set of user accounts is a subset of a second set of user accounts, wherein the second set of user accounts is included in a chat room of an instant messaging application, and wherein the first set of user accounts is different from the second set of user accounts;

displaying a list of a plurality of contents previously uploaded in the chat room including the second set of user accounts by the second set of user accounts sorted in an order of high similarity to a call topic between the first set of user accounts as candidate content to share on the display of the first user terminal with a call screen, wherein the list comprises information on an uploading user or a time of upload to the chat room of the plurality of contents, wherein the similarity to the call topic is determined by analyzing call data for a period of time;

receiving a user input for selecting from the candidate contents to share a content to share;

transmitting a co-view request associated with the content to share to the first external device, wherein the content to share is one of the plurality of contents previously uploaded in the chat room including the second set of user accounts; and displaying the content to share with a call screen between the first set of user accounts on a display of the first user terminal.

12. The method of claim 11, wherein the call topic between the first set of user accounts is determined by analyzing call data between the first set of user accounts for a predetermined time.

13. The method of claim 11, wherein information on a user who uploaded the candidate content to share to the chat room including the second set of user accounts, or information on a time when the candidate content to share is uploaded to the chat room including the second set of user accounts, is displayed on the display of the first user terminal with a preview associated with the candidate content to share.

14. A non-transitory computer-readable storage medium storing instructions that, when executed by at least one processor, cause the at least one processor to:

initiate, through a first external device, a call between a first set of user accounts, wherein the first set of user accounts comprises a first user account associated with a first user terminal and a second user account associated with a second user terminal, wherein the first set of user accounts is a subset of a second set of user accounts, wherein the second set of user accounts is included in a chat room of an instant messaging application, and wherein the first set of user accounts is different from the second set of user accounts;

transmit a co-view request associated with a content to share to the first external device, wherein the content to share is one of a plurality of contents previously uploaded within the chat room including the second set of user accounts; and display the content to share with a call screen between the first set of user accounts on a display of the first user terminal, wherein the transmitting the co-view request comprises:

displaying a list of the plurality of contents previously uploaded in the chat room including the second set of user accounts by the second set of user accounts on the display of the first user terminal, wherein the list comprises information on an uploading user or a time of upload to the chat room of the plurality of contents; and receiving a selection for one of the plurality of contents, and wherein the plurality of contents in the list are sorted and displayed in an order of high similarity to a call topic between the first set of user accounts, and wherein the similarity to the call topic is determined by analyzing call data for a period of time.

15. A first user terminal, comprising:
a communication interface;
a display;
a memory storing instructions; and
at least one processor configured to execute the instructions to:
  initiate, through a first external device, a call between a first set of user accounts, wherein the first set of user accounts comprises a first user account associated with the first user terminal and a second user account associated with a second user terminal, the first set of user accounts is a subset of a second set of user accounts, the second set of user accounts is included in a chat room of an instant messaging application, and the first set of user accounts is different from the second set of user accounts;
  transmit a co-view request associated with a content to share to the first external device, wherein the content to share is one of a plurality of contents previously uploaded within the chat room including the second set of user accounts; and
  display the content to share with a call screen between the first set of user accounts on the display of the first user terminal,
wherein the transmitting the co-view request comprises:
  displaying a list of the plurality of contents previously uploaded in the chat room including the second set of user accounts by the second set of user accounts on the display of the first user terminal, wherein the list comprises information on an uploading user or a time of upload to the chat room of the plurality of contents; and
  receiving a selection for one of the plurality of contents, and
wherein the plurality of contents in the list are sorted and displayed in an order of high similarity to a call topic between the first set of user accounts, and
wherein the similarity to the call topic is determined by analyzing call data for a period of time.

16. The first user terminal of claim 15, wherein the content to share is displayed in synchronization on the display of the first user terminal and on a display of the second user terminal.

* * * * *